Patented Dec. 16, 1930

1,785,082

UNITED STATES PATENT OFFICE

HANS RICHARD HAERTEL, OF WRENTHAM, MASSACHUSETTS, ASSIGNOR TO THOMAS H. DUMPER, TRUSTEE, OF NEWTON, MASSACHUSETTS

RUBBER ARTICLE AND METHOD OF PRODUCING THE SAME

No Drawing.   Application filed July 12, 1929.   Serial No. 377,896.

This application is a continuation in part of my application Serial No. 246,617, filed January 13, 1928.

My invention relates to the finishing of rubber articles, as for example rubber coated textiles such as are used for making raincoats.

The invention will be best understood from the following description of an example of an article made according to the invention, and of one example of the practice of an improved process according to the invention, while the scope of the invention will be more particularly pointed out in the appended claims.

For giving rubber coated textiles a gloss or semi-gloss finish it has been common practice to coat the same with a film of lacquer such as shellac. The present invention has among its objects the securing of a new and improved finish for rubber surfaces, the regulating of the degree of the gloss and other characteristics determining the appearance of such finish, the hardening of the same to prevent scuffing and scratching thereof, and the elimination of stickiness or tackiness of the surface.

The rubber compound, commonly colored and containing vulcanizing material, filler, and other constituents commonly employed in the art, may be applied to the textile sheet, which sheet commonly is of cotton, by use of the usual calendering process, it being understood that the rubber surface of the sheet leaving the hot calendering rolls is sticky or tacky. Commonly the rubber surface of the sheet is treated to eliminate this stickiness or tackiness before the sheet leaves the calendering machine so that it may be rolled up for convenient handling. According to the common practice, the roll of sheeting is then removed to a varnishing room and varnished with more or less transparent shellac or other lacquer, and afterwards heat treated for vulcanizing it.

According to the present invention, an improved finish is given the shellacked rubber surface by treating the shellac surface with a liquid substance, preferably inert with respect to both rubber and shellac, which when dry will be indistinguishable from the shellac, yet give the material the desired improved finish.

According to one manner of practising the invention the rubberized sheets after being shellacked may be treated with an ammonia solution of magnesium carbonate, containing a suitable substance for causing the solution to "wet" the shellac surface, so that the solution may be uniformly distributed in a thin film, which film when dried will secure the objects hereinbefore mentioned.

As a suitable treating liquid, but without limitation thereto, magnesium carbonate dissolved in ammonia water may be employed with addition of methyl alcohol. A liquid consisting of from 1 to 2 pounds magnesium carbonate dissolved in 4 gallons of 26° Baumé commercial ammonia water, with addition of 1 gallon commercial standard methyl alcohol, has been found to give satisfactory results. The probable action which occurs is that, because the ammonium carbonate is unstable, the ammonia ($NH_3$) and water constituents of the solution pass off in gas or vapor form, leaving an invisible, uniformly distributed smooth layer composed of very minute particles of magnesium carbonate. The alcohol, besides "wetting" the shellac surface, probably somewhat softens the surface, causing better adherence of the carbonate particles or impregnation of the same into the shellac surface, and has the important action of causing rapid drying of the film.

I have found that relatively small amounts of alcohol, say about 5% or 6% of the ammonia content, are sufficient to cause "wetting" of the surface, but that when the alcohol content becomes less than about 20% of the ammonia content, in the above example, the drying of the film becomes rather slow, necessitating, in some instances, the use of an artificial source of heat, say passing the sheet through a dryer, to secure best results.

As substitutes for magnesium carbonate other inorganic metal carbonates such as zinc carbonate, lead carbonate, and silver carbonate, which are soluble in ammonia, (see Hand Book of Chemistry & Physics by Hogman, Coolbaugh & Senseman, published by The Chemical Rubber Company, Cleveland, Ohio, 1918), may be employed. Those metal carbonates soluble in ammonia, such as copper carbonate, which deleteriously attack rubber or the constituents of the rubber compound, are not as satisfactory for the purpose. As substitutes for methyl alcohol, ethyl alcohol may be employed, and in some cases other volatile liquids such as acetone. The amount of metal carbonate employed may be varied according to the desired finish.

With the above examples of materials the treatment described will impart to the surface of the shellac a comparatively dull "tulle" like finish very pleasing in appearance, and hardened sufficiently to cause it to possess the properties of resisting scuffing and scratching, with elimination of all stickiness and tackiness. The dulling effect is probably secured by the refractive action of the multitude of metal carbonate particles, which themselves are invisible, or substantially so, due to their transparent nature. The metal carbonate coating does not dull the surface to any substantial extent in the sense that it causes decolorization or opaqueness, as with prior processes employing organic substances which react with the rubber or shellac, with the result that when the present invention is employed the coloring effect of the pigment in the rubber compound is not decreased in respect to the final product. Compared with prior processes the present invention in this latter respect effects a material saving in expensive coloring material, because were the surface of the shellac decolorized or rendered opaque to any substantial extent, as with prior processes, an additional amount of coloring material would need be added to the rubber compound to compensate for this.

As a more preferable manner of practising the invention, the rubber surface of the coated textile, prior to being rolled up and removed from the calendering machine, and while it is still warm from the heat of the calendering rolls, may be shellacked and the surface of the dry or partially dry shellac treated as above explained, which I have found will secure the desired finish and make it unnecessary to treat the rubber surface to eliminate the stickiness or tackiness thereof prior to shellacking, thus permitting the material to be taken from the calendering machine directly to the vulcanizing room where it may be heat treated in the common manner, say maintaining it at 270° Fahrenheit for three hours. It will be observed that shellacking the rubber surface, and treating the shellac surface while the sheet is in the calendering machine, eliminates the necessity of removing the roll of sheeting to a varnishing room for finishing it.

The shellac and the shellac treating liquid may be applied by use of common forms of coating apparatus employed in the art, as for example by use of the familiar apparatus comprising a "doctor" roll coextensive in length with the width of the sheet and dipping at its under side into a tank containing the shellac or treating liquid while the surface of the sheet to be treated is passed over the top of the roll in contact therewith, and is afterward "wiped" by passing over a scraping edge to leave a film of the coating thereon.

It has been proposed to harden and dull the surface of a shellac coating on rubber coated textiles, after the shellac is dried, by use of bromine dissolved in carbon tetrachloride, with the result that not only are the workmen exposed to highly disagreeable and dangerous fumes, but an inferior product is produced. It has been found shellac coatings on rubber sheeting are usually broken in the sense that they contain multitudes of microscopic cracks which expose the surface of the rubber to the action of the treating liquid, with the result that when bromine is employed for this purpose the rubber is oxidized, causing it in time to deteriorate. Independently of this action the bromine likewise has an oxidizing action upon the shellac, the initial oxidized film in time penetrating through the film of shellac, with the result that the product has a shorter life.

The present invention is distinguished from the above mentioned process of treating the shellacked surface with bromine in that the present method does not enforce the use of substances which react chemically with the rubber and shellac, but permits, when desired, the use of substances inert with respect to rubber and shellac, as for example the magnesium carbonate referred to.

It will be understood that the above described materials and the particular steps of the method described are illustrative only, and that wide deviations may be made from these within the scope of the invention without departing from its spirit.

Claims—

1. That improvement in the method of producing rubberized textile sheets which comprises coating the tacky surface of the rubber with shellac, and afterward wetting the surface of the shellac with a liquid containing an ammonia solution of a metal carbonate.

2. That improvement in the method of producing rubberized textile sheets which comprises coating the tacky surface of the rubber with shellac, and afterward wetting the surface of the shellac with a liquid containing alcohol and an ammonia solution of a metal carbonate.

3. That improvement in the method of producing rubberized textile sheets which comprises coating the tacky surface of the rubber with shellac, and afterward wetting the surface of the shellac with a liquid containing an ammonia solution of magnesium carbonate.

4. That improvement in the method of producing rubberized textile sheets which comprises coating the tacky surface of the rubber with shellac, and afterward wetting the surface of the shellac with a liquid containing alcohol and an ammonia solution of magnesium carbonate.

5. That improvement in the method of producing rubberized textile sheets which comprises coating the tacky surface of the rubber with shellac, and afterward wetting the surface of the shellac with a liquid containing an ammonia solution of a metal carbonate inert with respect to rubber and a shellac softening agent.

6. That improvement in the method of producing rubberized textile sheets which comprises surfacing the sheets with rubber by use of hot calender rolls, and while the rubber is hot and tacky coating the same with shellac and wetting the shellac surface with an ammonia solution of a metal carbonate inert with respect to rubber.

7. That improvement in the method of producing rubberized textile sheets which comprises surfacing the sheets with rubber by use of hot calender rolls, and while the rubber is hot and tacky coating the same with shellac and wetting the shellac surface with a liquid containing alcohol and an ammonia solution of a metal carbonate inert with respect to rubber.

8. An article of manufacture comprising a rubber coated textile sheet, the surface of the rubber having a shellac coating, the latter having thereon a substantially invisible and transparent coating of a metal carbonate.

9. An article of manufacture comprising a rubber coated textile sheet, the surface of the rubber having a shellac coating, the latter having thereon a substantially invisible and transparent coating comprising microscopic metal carbonate particles.

10. An article of manufacture comprising a rubber coated textile sheet, the surface of the rubber having a shellac coating, the latter having thereon a substantially invisible and transparent coating of magnesium carbonate.

11. An article of manufacture comprising a rubber coated textile sheet, the surface of the rubber having a shellac coating, the latter having thereon a substantially invisible and transparent coating comprising microscopic magnesium carbonate particles.

In testimony whereof, I have signed my name to this specification.

HANS RICHARD HAERTEL.